United States Patent
Akuzawa

(10) Patent No.: US 10,933,823 B2
(45) Date of Patent: Mar. 2, 2021

(54) ELECTRIC POWER SOURCE SYSTEM FOR VEHICLE

(71) Applicant: TOYOTA JIDOSHA KABUSHIKI KAISHA, Toyota-shi, Aichi-ken (JP)

(72) Inventor: Ken Akuzawa, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/507,475

(22) Filed: Jul. 10, 2019

(65) Prior Publication Data

US 2020/0070753 A1 Mar. 5, 2020

(30) Foreign Application Priority Data

Aug. 30, 2018 (JP) .............................. JP2018-161526

(51) Int. Cl.
*B60R 16/023* (2006.01)
*B60R 16/033* (2006.01)
(Continued)

(52) U.S. Cl.
CPC ........ *B60R 16/0231* (2013.01); *B60R 16/033* (2013.01); *B60W 10/18* (2013.01); *B60W 10/20* (2013.01); *G05D 1/021* (2013.01)

(58) Field of Classification Search
CPC ... B60R 16/0231; B60R 16/03; B60R 16/033; B60W 10/18; B60W 10/20; G05D 1/021
(Continued)

(56) References Cited

U.S. PATENT DOCUMENTS

2008/0293539 A1* 11/2008 Matsubara ............ B60W 10/08
477/37
2008/0309163 A1* 12/2008 Hashimoto ........... H02J 7/0029
307/31
(Continued)

FOREIGN PATENT DOCUMENTS

DE 102015200124 A1 7/2016
DE 102015222544 A1 5/2017
(Continued)

OTHER PUBLICATIONS

Diebig, Maja et al. "Optimizing Multi-Voltage Automotive Power Supply Systems Using Electro-Thermal Simulation", Dec. 1, 2014.
(Continued)

*Primary Examiner* — William Hernandez
(74) *Attorney, Agent, or Firm* — Oliff PLC

(57) ABSTRACT

An electric power source system for a vehicle includes: a high-voltage battery; a first electric power source arrangement; a second electric power source arrangement; and a third electric power source arrangement, wherein the first electric power source arrangement includes a first DCDC converter and a first battery and is configured to supply the electric power to a first load including at least an automatic driving system, the second electric power source arrangement includes a second DCDC converter and a second battery and is configured to supply the electric power to a second load including at least a steering ECU, a brake ECU, and an information communication unit, and the third electric power source arrangement includes a connection controller and a third battery and is configured to supply the electric power to a third load including at least the steering ECU, the brake ECU, and the information communication unit.

6 Claims, 2 Drawing Sheets

(51) Int. Cl.
    *B60W 10/18*    (2012.01)
    *B60W 10/20*    (2006.01)
    *G05D 1/02*     (2020.01)

(58) Field of Classification Search
    USPC .................................................. 307/9.1, 10.1
    See application file for complete search history.

(56) References Cited

U.S. PATENT DOCUMENTS

| | | | |
|---|---|---|---|
| 2009/0234531 A1* | 9/2009 | Sayama | H02J 9/061 |
| | | | 701/31.7 |
| 2017/0197565 A1 | 7/2017 | Yoneyama et al. | |
| 2017/0349048 A1 | 12/2017 | Nakayama et al. | |
| 2018/0219407 A1* | 8/2018 | Nakamura | G01R 31/389 |
| 2019/0283609 A1 | 9/2019 | Symanow et al. | |
| 2020/0070661 A1 | 3/2020 | Akuzawa | |
| 2020/0079366 A1* | 3/2020 | Higashitani | B60W 30/18154 |

FOREIGN PATENT DOCUMENTS

| | | |
|---|---|---|
| DE | 10201620097 A2 | 7/2017 |
| DE | 102016221250 A1 | 5/2018 |
| EP | 3354520 A1 | 8/2018 |
| JP | 2017-127112 A | 7/2017 |
| JP | 2017-218013 A | 12/2017 |
| JP | 2018-068040 A | 4/2018 |
| WO | 2015/082113 A1 | 6/2015 |

OTHER PUBLICATIONS

U.S. Appl. No. 16/508,846 filed Jul. 11, 2019.
Aug. 5, 2020 Office Action issued in U.S. Appl. No. 16/508,846.
Oct. 28, 2020 Notice of Allowance issued in U.S. Appl. No. 16/508,846.

* cited by examiner

ELECTRIC POWER SOURCE SYSTEM FOR VEHICLE

INCORPORATION BY REFERENCE

The disclosure of Japanese Patent Application No. 2018-161526 filed on Aug. 30, 2018 including the specification, drawings and abstract is incorporated herein by reference in its entirety.

BACKGROUND

1. Technical Field

The present disclosure relates to an electric power source system for a vehicle.

2. Description of Related Art

Disclosed in Japanese Patent Application Publication No. 2017-218013 (JP 2017-218013 A) is an electric power source system for a vehicle, including an electric power source that has a redundant configuration of a main electric power source and a sub electric power source (backup electric power source), the electric power source being configured to supply electric power to a driving support system including an adaptive cruise control (ACC), lane keeping assist (LKA), and automatic braking. In such an electric power source system for a vehicle, even when abnormality occurs in the main electric power source while the driving support system is in operation, operation of the driving support system can be continued with the sub electric power source due to the redundant power source configuration.

SUMMARY

In the case of the electric power source system for a vehicle disclosed in JP 2017-218013 A, when an automatic driving system is post-fitted to a vehicle, it is conceivable to connect the automatic driving system to an existing electric power source arrangement for on-board infrastructure, for example. However, in the configuration where the automatic driving system is connected to the electric power source arrangement for on-board infrastructure, the automatic driving system is influenced by a voltage fluctuation generated by a load group of the on-board infrastructure. Accordingly, voltage supplied to the automatic driving system may become unstable, which may hinder optimal operation of the automatic driving system.

The present disclosure provides an electric power source system for a vehicle, capable of stabilizing an electric power source arrangement for an automatic driving system.

An electric power source system for a vehicle according to one aspect of the present disclosure includes: a first electric power source arrangement configured to be supplied with electric power from the high-voltage battery; a second electric power source arrangement configured to be supplied with the electric power from the high-voltage battery; and a third electric power source arrangement configured to be supplied with the electric power from the high-voltage battery, wherein the first electric power source arrangement is connected to a first load including at least an automatic driving system, the first electric power source arrangement includes a first DCDC converter and a first battery, the first DCDC converter being configured to perform voltage conversion of the electric power supplied from the high-voltage battery and to output electric power of which voltage is converted, and the first battery being supplied with the electric power output from the first DCDC converter, the first electric power source arrangement is configured to supply the electric power output from the first DCDC converter and the electric power of the first battery to the first load, the second electric power source arrangement is connected to a second load including at least a steering ECU, a brake ECU, and an information communication unit configured to exchange control information with the automatic driving system, the second electric power source arrangement includes a second DCDC converter and a second battery, the second DCDC converter being configured to perform voltage conversion of the electric power supplied from the high-voltage battery and to output electric power of which voltage is converted, and the second battery being supplied with the electric power output from the second DCDC converter, the second electric power source arrangement is configured to supply the electric power output from the second DCDC converter and the electric power of the second battery to the second load, the third electric power source arrangement is connected to a third load including at least the steering ECU, the brake ECU, and the information communication unit, the third electric power source arrangement includes a connection controller and a third battery, the connection controller being configured to control a connection state between the second DCDC converter and the third load, and the third battery being supplied with the electric power output from the second DCDC converter through the connection controller, and the third electric power source arrangement is configured to supply the electric power output from the second DCDC converter to the third load through the connection controller and to supply the electric power of the third battery to the third load.

The electric power source system for a vehicle of the present disclosure can stabilize the electric power source arrangement for the automatic driving system.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Outline

The present disclosure constructs an electric power source system in which an electric power source arrangement for an automatic driving system is separated from an electric power source arrangement for on-board infrastructure. As a result, the electric power source arrangement for the automatic driving system is protected from an influence of voltage fluctuation generated in the electric power source arrangement for the on-board infrastructure. This makes it possible to stabilize the electric power source arrangement for the automatic driving system.

Configuration

Figure 1:
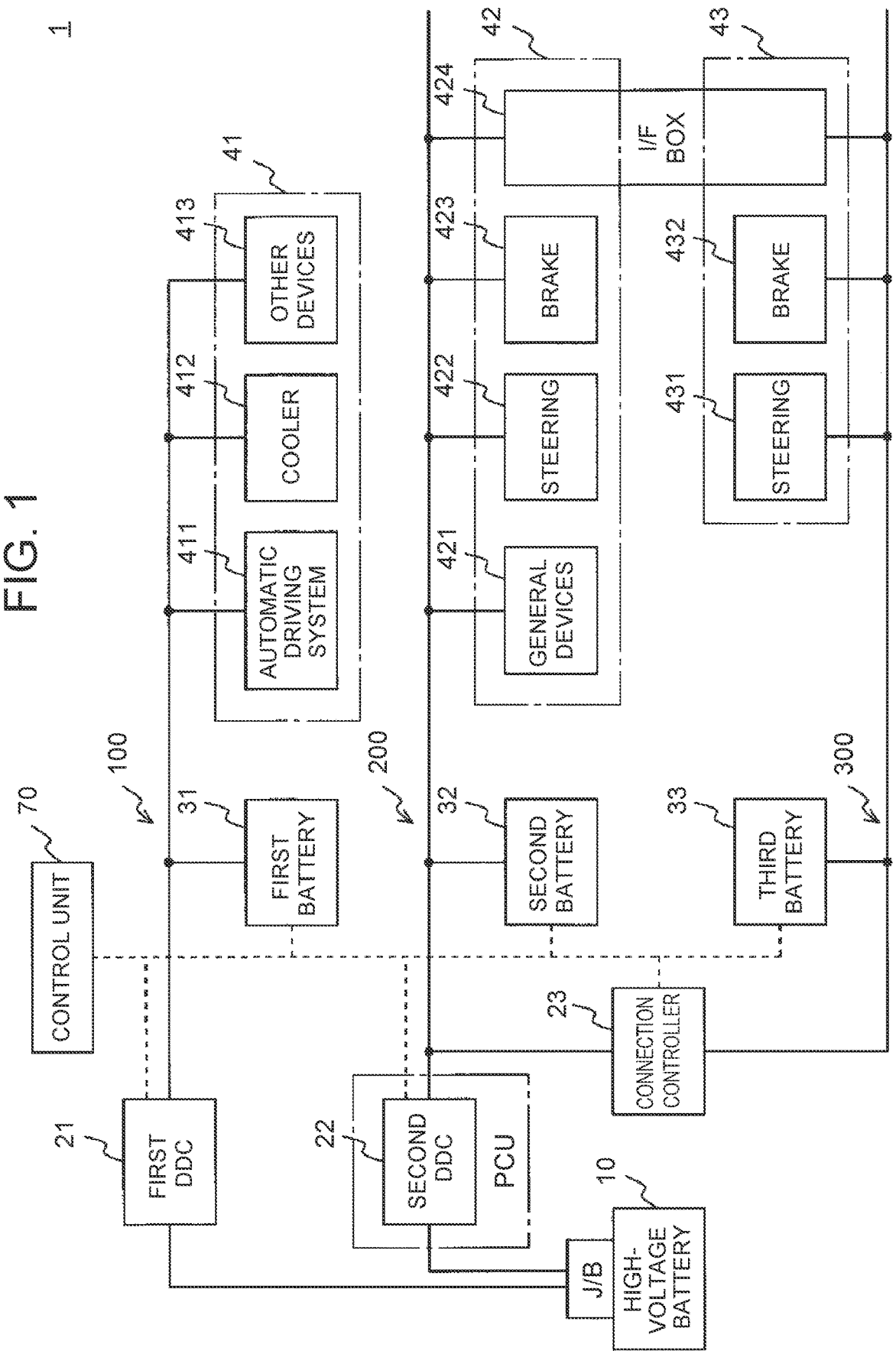
FIG. 1 shows an outlined configuration of an electric power source system for a vehicle according to one embodiment of the present disclosure.

FIG. 1 shows an outlined configuration of an electric power source system for a vehicle 1 according to one embodiment of the present disclosure. The electric power source system for a vehicle 1 shown in FIG. 1 includes a first electric power source arrangement 100, a second electric power source arrangement 200, and a third electric power source arrangement 300. The first electric power source arrangement 100 includes a first DCDC converter (DDC) 21 and a first battery 31, and a first load 41 is connected thereto. The second electric power source arrangement 200 includes a second DCDC converter (DDC) 22 and a second battery 32, and a second load 42 is connected thereto. The third electric power source arrangement 300 includes a connection controller 23 and a third battery 33, and a third load 43 is connected thereto. The electric power source system for a vehicle 1 also includes a high-voltage battery 10, and a control unit 70. The electric power source system for a vehicle 1 is mounted on a hybrid vehicle or an electric vehicle capable of performing automatic driving.

The high-voltage battery 10 is a battery of high voltage that is configured in a chargeable and dischargeable manner. Examples of the high-voltage battery 10 may include a lithium ion battery and a nickel-hydrogen battery. The high-voltage battery 10 is connected with prescribed devices, such as the first DCDC converter 21, the second DCDC converter 22, and an unshown motor generator (MG), which are required to drive the vehicle. The high-voltage battery 10 can supply electric power of high voltage to the first DCDC converter 21, the second DCDC converter 22, and the prescribed devices in parallel through a junction box (JB) having a role of a distributor or a breaker.

The control unit 70 is an electronic control unit (ECU) that can control the state of the electric power source system for a vehicle 1. Specifically, the control unit 70 acquires information (such as voltage, current, and temperature) on the first battery 31, the second battery 32, and the third battery 33, and estimates the state of each battery from the acquired information. The information on each battery can be obtained by using unshown devices, such as a voltage sensor, an electric current sensor, and a temperature sensor, provided in each battery. The details of the state to be estimated will be described later. Based on the estimated state, the control unit 70 optimally controls the first DCDC converter 21, the second DCDC converter 22, and the connection controller 23. The details of the control method will be described later.

First Electric Power Source Arrangement

The first electric power source arrangement 100 is an electric power source arrangement for supplying electric power, dedicated for load operation, to the loads, such as devices that constitute an automatic driving system for performing automatic driving, the automatic driving system being provided for the vehicle from an original equipment manufacturing (OEM) company, a MaaS (Mobility-as-a-Service) company, or the like. The devices that constitute the automatic driving system may be introduced into a vehicle in advance at the time of shipment, or may be introduced (post-installed) into a vehicle after shipment. The first electric power source arrangement 100 is constructed separately from the later-described second electric power source arrangement 200 and third electric power source arrangement 300 for on-board infrastructure.

The first DCDC converter 21 can convert high voltage electric power supplied from the high-voltage battery 10 to a prescribed low voltage electric power, and outputs (supplies) the low voltage electric power to the first battery 31 and the first load 41. The prescribed low voltage may be the voltage required in order to operate the devices that constitute the automatic driving system provided for the vehicle from an OEM company, a MaaS company, or the like.

The first battery 31 is an electric power storage element, such as a lead battery or a lithium ion battery, which is configured in a chargeable and dischargeable manner. The first battery 31 is configured to be able to store the electric power output from the first DCDC converter 21 and be able to supply the electric power to the first load 41. The control unit 70 monitors the state of the first battery 31.

The first load 41 is a device provided by an OEM company, a MaaS company, or the like. One example of the first load 41 may be a device including an automatic driving system 411. The first load 41 may be the device further including a cooler 412, and other devices 413. The automatic driving system 411 is a device for controlling automatic driving of a vehicle. The cooler 412 is a device for cooling electronic control units (not shown), or the like, which generate heat during operation of the automatic driving system 411, for stabilizing the operation. The other devices 413 include devices, other than the automatic driving system 411 and the cooler 412, which relate to automatic driving. The cooler 412 and the other devices 413 are omissible if they are not indispensable in the automatic driving operation performed by the automatic driving system 411. Note that, in one example of the present embodiment, a vehicle incorporating the first battery 31 and the first DCDC converter 21 is provided with the automatic driving system 411, the cooler 412, and the other devices 413 as the devices that constitute the automatic driving system. However, instead of being incorporated in the vehicle in advance, one or both of the first battery 31 and the first DCDC converter 21 may be provided for the vehicle afterward, together with the devices constituting the automatic driving system, for example.

Second Electric Power Source Arrangement

The second electric power source arrangement 200 is an electric power source arrangement for supplying electric power, dedicated for load operation, to each load that is connected to the on-board infrastructure that is constructed to implement various functions mounted on a vehicle, the various functions being originally designed functions, other than the functions provided from an OEM company, a MaaS company, or the like after the vehicle is designed.

The second DCDC converter 22 can convert high voltage electric power supplied from the high-voltage battery 10 to a prescribed low voltage electric power, and outputs (supplies) the low voltage electric power to the connection controller 23, the second battery 32, and the second load 42. The prescribed low voltage can be a voltage required in order to operate the second load 42 in the on-board infrastructure. Note that the second DCDC converter 22 may include unshown devices, such as an inverter and a boost converter, and be configured as part of a power control unit (PCU) that controls powering operation and regenerative operation by the motor generator (MG).

The second battery 32 is an electric power storage element, such as a lead battery or a lithium ion battery, which is configured in a chargeable and dischargeable manner. The second battery 32 is configured to be able to store the electric power output from the second DCDC converter 22, and output (supply) the electric power stored in the second battery 32 to the second load 42 and the connection controller 23. The control unit 70 monitors the state of the second battery 32.

In one example, the second load 42 includes an ECU 422 that controls steering (EPS), an ECU 423 that controls braking, an interface box (IF_BOX) 424, and general devices 421 including devices other than these listed elements mounted on the vehicle. The interface box 424 is an information communication unit that exchanges information between the automatic driving system 411 provided for the vehicle from an OEM company, a MaaS company, or the like, and the various systems mounted on the vehicle. The interface box 424 plays a role of a gateway. The interface box 424 can communicate with the automatic driving system 411 to acquire and store path data that is an operation plan with regard to automatic driving of the vehicle, the path data being generated in the automatic driving system 411.

Third Electric Power Source Arrangement

The third electric power source arrangement 300 is an electric power source arrangement redundantly configured for the purpose of backing up the second electric power source arrangement 200. The third electric power source arrangement 300 is configured to enable the loads, required for permitting the vehicle to safely perform limp home operation, to continuously operate when a power source fault occurs in the second electric power source arrangement 200.

The connection controller 23 is interposed between the second DCDC converter 22 and the third load 43 to control the connection state between the second DCDC converter 22 and the third load 43. The connection controller 23 may be configured from a semiconductor relay that switches between an electrically connected state and a disconnected state, or a DCDC converter that performs voltage-conversion of input voltage (to the same voltage, to higher voltage, or to lower voltage) and outputs the converted voltage, for example. The connection controller 23 can output (supply) some of the electric power that is output from the second DCDC converter 22 to the third battery 33 and the third load 43.

The third battery 33 is an electric power storage element, such as a lead battery or a lithium ion battery, which is configured in a chargeable and dischargeable manner. The third battery 33 is configured to be able to store the electric power output from the connection controller 23 and supply the electric power to the third load 43. The control unit 70 monitors the state of the third battery 33.

In one example, the third load 43 includes an ECU 431 that controls the steering (EPS), an ECU 432 that controls braking, and the interface box (IF_BOX) 424 described above. The steering ECU 431 is redundantly configured to have the function equivalent to the steering ECU 422. The brake ECU 432 is redundantly configured to have the function equivalent to the brake ECU 423.

Note that the configuration example of the present embodiment described above has a redundant configuration in which the respective steering ECUs and brake ECUs are connected to the second electric power source arrangement 200 and the third electric power source arrangement 300 in an independent manner. However, a single configuration that can receive electric power supply from both the second electric power source arrangement 200 and the third electric power source arrangement 300 may be possible. In addition, a single configuration of the interface box 424 is adopted that can receive electric power supply from both the second electric power source arrangement 200 and the third electric power source arrangement 300. However, the interface box 424 may be redundantly configured such that two interface boxes 424 are independently connected to the second electric power source arrangement 200 and the third electric power source arrangement 300.

Operation by Configuration

Description is given to one example of the operation implementable by the electric power source system for a vehicle 1 constituted of the first electric power source arrangement 100, the second electric power source arrangement 200, and the third electric power source arrangement 300.

In the electric power source system for a vehicle 1, the first electric power source arrangement 100 including the automatic driving system 411 is configured separately from the second electric power source arrangement 200 and the third electric power source arrangement 300 for the on-board infrastructure. That is, the electric power source arrangements can be separated by interposing the DCDC converters 21, 22, capable of restraining voltage fluctuation, between the first electric power source arrangement 100, and the second electric power source arrangement 200 and the third electric power source arrangement 300. With the configuration, the automatic driving system 411 can avoid receiving the influence of the voltage fluctuation caused by the second load 42 and the third load 43 connected to the on-board infrastructure. This makes it possible to stabilize the first electric power source arrangement 100 connected to the automatic driving system 411, and to optimally operate automatic driving.

In the electric power source system for a vehicle 1, the path data that is an automatic driving plan formed by the automatic driving system 411 is stored in the interface box 424. Accordingly, in the case where, for example, a power source fault occurs in the first battery 31 of the first electric power source arrangement 100 at the time of traveling by automatic driving, the automatic driving system 411 is stopped or reset. However, in accordance with the path data stored in the interface box 424, the steering ECU 422 and the brake ECU 423 can be optimally controlled so as to operate the vehicle until the vehicle is put in a safe state, such as being parked by the side of a road.

In addition, in the case where a power source fault further occurs in the second battery 32 of the second electric power source arrangement 200, the steering ECU 422 and the brake ECU 423 break down. However, with the third battery 33 of the third electric power source arrangement 300, the steering ECU 431 and the brake ECU 432 can continuously be operated. Thus, in accordance with the path data stored in the interface box 424, the steering ECU 431 and the brake ECU 432 can be optimally operated so as to operate the vehicle until the vehicle is put in the safe state, such as being parked by the side of a road.

Control

Figure 2:
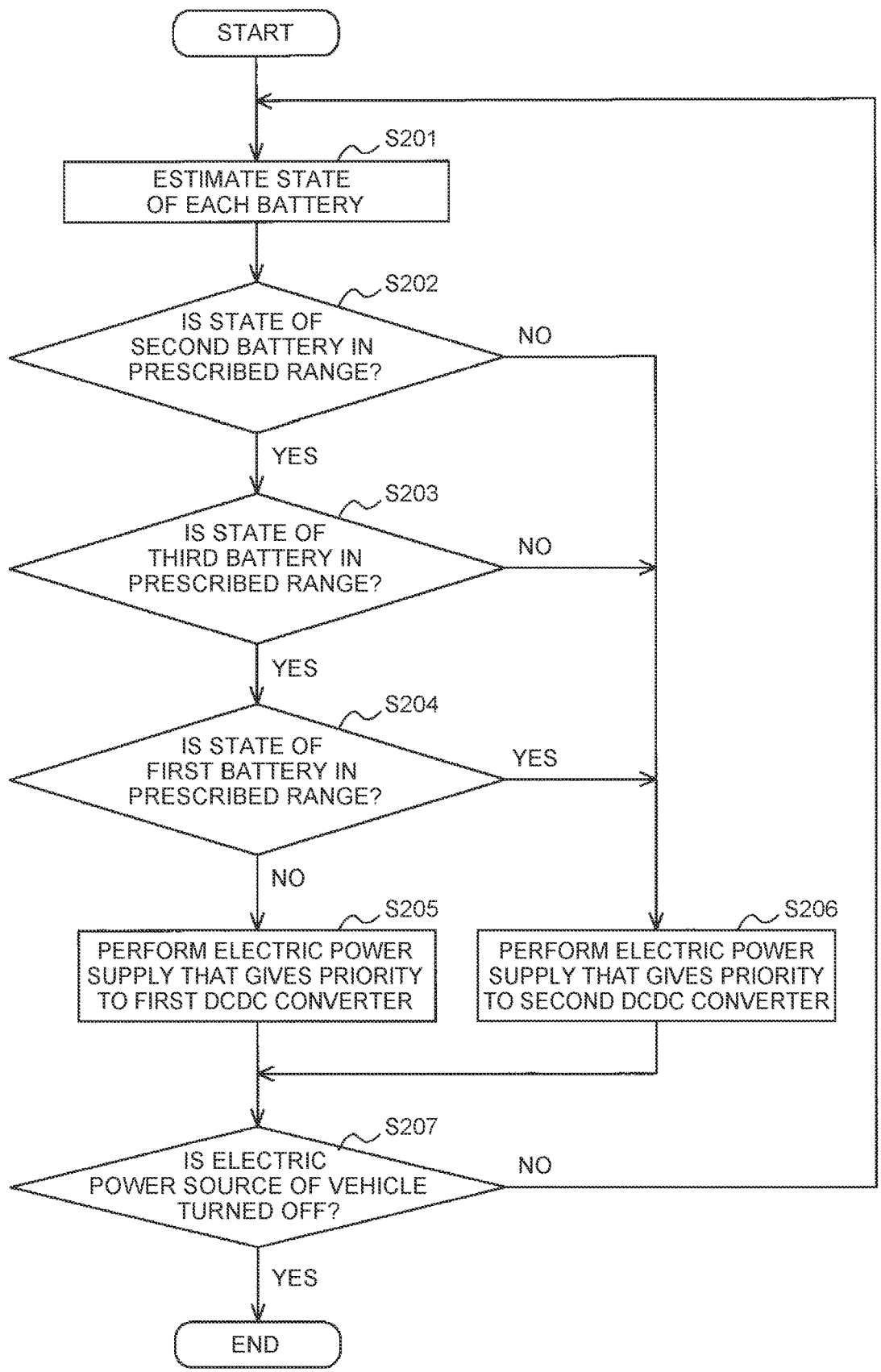
FIG. 2 is a flow chart illustrating procedures for a DDC control process performed by a control unit.

Description is now given to the control executed in the electric power source system for a vehicle 1 with reference to FIG. 2. FIG. 2 is a flowchart showing the procedures for a DCDC converter (DDC) control process performed by the control unit 70 of the electric power source system for a vehicle 1 according to the present embodiment.

The DDC control process shown in FIG. 2 is started when a power source of the vehicle is turned on, and the DDC control process is repeatedly executed until the power source is turned off.

Step S201: the control unit 70 estimates the state of each battery based on the battery information obtained from the first battery 31, the second battery 32, and the third battery 33. Examples of the state to be estimated may include a state of charge (SOC), a state of function (SOF), an open circuit voltage (OCV), a capacity, and an output voltage (when prescribe current is discharged at prescribed voltage for prescribed time) based on a predefined condition.

Step S202: the control unit 70 determines whether the estimated state of the second battery 32 is the state that requires charging. Whether the estimated state is the state that requires charging may be determined based on whether a value acquired in order to estimate the state of the second battery 32 is within a prescribed range. For example, the determination may be made based on whether an estimated SOC is in a range A [%], whether an estimated OCV is in a range B [V], whether an estimated capacity is in a range C [Ah], or whether an estimated output voltage is in a range D [V]. Also, the determination can be made based on any one of these determinations or on a combination of the determinations. These ranges A through D are suitably set depending on the value requested for operation of the second load 42. When the value acquired to estimate the state of the second battery 32 is within the above range, (S202, Yes), the control unit 70 advances the process to step S203. When the value acquired to estimate the state of the second battery 32 is not in the above range (S202, No), the control unit 70 advances the process to step S206.

Step S203: the control unit 70 determines whether the estimated state of the third battery 33 is the state that requires charging. Whether the estimated state is the state that requires charging may be determined based on whether a value acquired in order to estimate the state of the third battery 33 is within a prescribed range. For example, the determination may be made based on whether an estimated SOC is in a range E [%], whether an estimated OCV is in a range F [V], whether an estimated capacity is in a range G [Ah], or whether an estimated output voltage is in a range H [V]. Also, the determination can be made based on any one of these determinations or on a combination of the determinations. These ranges E through H are suitably set depending on the value requested for operation of the third load 43. When the value acquired to estimate the state of the third battery 33 is within the above range, (S203, Yes), the control unit 70 advances the process to step S204. When the value acquired to estimate the state of the third battery 33 is not in the above range (S203, No), the control unit 70 advances the process to step S206.

Step S204: the control unit 70 determines whether the estimated state of the first battery 31 is the state that requires charging. Whether the estimated state is the state that requires charging may be determined based on whether a value acquired in order to estimate the state of the first battery 31 is within a prescribed range. For example, the determination may be made based on whether an estimated SOC is in a range I [%], whether an estimated OCV is in a range J [V], whether an estimated capacity is in a range K [Ah], or whether an estimated output voltage is in a range L [V]. Also, the determination can be made based on any one of these determinations or on a combination of the determinations. These ranges I through L are suitably set depending on the value requested for operation of the first load 41. When the value acquired to estimate the state of the first battery 31 is within the above range, (S204, Yes), the control unit 70 advances the process to step S206. When the value acquired to estimate the state of the first battery 31 is not in the above range (S204, No), the control unit 70 advances the process to step S205.

Note that the ranges A through L described above may all be different values, or may partially be identical.

Step S205: the control unit 70 performs power supply control that gives priority to the first DCDC converter 21 over the second DCDC converter 22. That is, the control unit 70 performs control to promote charging of the first battery 31 more than the second battery 32 or the third battery 33 so as to increase the storage amount of the first battery 31. The control can reduce the risk that the first battery 31 falls into an overdischarging state or the risk that the voltage is lowered and the function of the first load 41 is reset, for example. The power supply control that gives priority to the first DCDC converter 21 may include, for example, the control where a voltage instruction value to the first DCDC converter 21 is made higher than a voltage instruction value at normal time (when the state of the first battery 31 is in a prescribed range) so as to promote charging of the first battery 31. Such control is useful in the case where the voltage instructions to both the first DCDC converter 21 and the second DCDC converter 22 cannot be increased at the same time, such as when the electric power feedable from the high-voltage battery 10 is limited. After the power supply control is performed, the process proceeds to step S207.

Step S206: the control unit 70 performs power supply control that gives priority to the second DCDC converter 22 over the first DCDC converter 21. That is, the control unit 70 performs control to promote charging of the second battery 32 and the third battery 33 more than the first battery 31 so as to increase the storage amount of the second battery 32 and the third battery 33. The control can reduce the risk that the second battery 32 falls into an overdischarging state or the risk that the voltage is lowered and the function of the second load 42 is reset, for example. The power supply control that givens priority to the second DCDC converter 22 may include, for example, the control where a voltage instruction value to the second DCDC converter 22 is made higher than a voltage instruction value at normal time (when the states of the second battery 32 and the third battery 33 are in a prescribed range) so as to promote charging of the second battery 32. After the power supply control is performed, the process proceeds to step S207.

Step S207: the control unit 70 determines whether a prescribed event that ends the present DDC control process occurs. The prescribed event includes, for example, that the power source of the vehicle is turned off, or that traveling of the vehicle is ended. When the event occurs (S207, Yes), the control unit 70 ends the present DDC control process. When the event does not occur (S207, No), the control unit 70 returns the process to step S201.

In the DDC control process, electric power supply to the first battery 31, the second battery 32, and the third battery 33 can be optimally controlled by performing cooperative control of the first DCDC converter 21 and the second DCDC converter 22. For example, when the capacity of the first battery 31 in the first electric power source arrangement 100 that is connected to the automatic driving system 411 is lowered, the electric power supply from the high-voltage battery 10 to the first battery 31 can be performed in priority to the electric power supply to the second battery 32 and the third battery 33 in the electric power source arrangement for on-board infrastructure.

Operation and Effect in Present Embodiment

As described in the foregoing, in the electric power source system for a vehicle 1 according to the present embodiment, the first electric power source arrangement 100 connected to the automatic driving system 411 is separated from the second electric power source arrangement 200 and the third electric power source arrangement 300 for the on-board infrastructure. Thus, the first electric power source arrangement 100 connected to the automatic driving system 411 is not subjected to a voltage fluctuation caused by the second load 42 and the third load 43 in the on-board infrastructure. Therefore, the electric power source arrangement for the automatic driving system 411 is stabilized, and optimal operation of the automatic driving is achieved.

In the electric power source system for a vehicle 1 according to the present embodiment, the control unit 70 manages the state of each battery and controls each DCDC converter (DDC) in cooperation so as to appropriately control electric power supply from the high-voltage battery 10 to each battery such that the state of each battery is in a prescribed range. Hence, in the case where the electric power feedable from the high-voltage battery 10 is limited, such as when the capacity of the first battery 31 is lowered, electric power supply that gives priority to the first DCDC converter 21 is performed. This makes it possible to avoid the situation where automatic driving is spontaneously reset regardless of the intention of a driver during operation of the automatic driving system 411, while controlling the feed amount of electric power from the high-voltage battery 10. Moreover, in the case where the electric power feedable from the high-voltage battery 10 is limited, such as when the capacity of the second battery 32 and the third battery 33 is lowered, electric power supply that gives priority to the second DCDC converter 22 is performed. This makes it possible to reduce the risk of overdischarging of the second battery 32 or the third battery 33, while reducing the risk that operation such as "travel, turn, and stop" becomes heavy while the vehicle travels.

In the electric power source system for a vehicle 1 according to the present embodiment, in addition to the control unit 70 performing cooperative control so as to keep the state of each battery in a prescribed range, the interface box 424 stores the path data on automatic driving generated in the automatic driving system 411. Accordingly, while electric power supply that gives priority to the second DCDC converter 22 over the first DCDC converter 21 is performed, automatic driving can be continued based on the information in the interface box 424. Therefore, even when a failure should occur in the automatic driving system 411 that is provided from an OEM company, a MaaS company, or the like, during traveling of the vehicle, traveling by automatic driving can be maintained with each load connected to the on-board infrastructure of the vehicle.

What is claimed is:

1. An electric power source system for a vehicle, comprising:
    a high-voltage battery;
    a first electric power source arrangement configured to be supplied with electric power from the high-voltage battery;
    a second electric power source arrangement configured to be supplied with the electric power from the high-voltage battery; and
    a third electric power source arrangement configured to be supplied with the electric power from the high-voltage battery,
    wherein
    the first electric power source arrangement is connected to a first load including at least an automatic driving system,
    the first electric power source arrangement includes a first DCDC converter and a first battery, the first DCDC converter being configured to perform voltage conversion of the electric power supplied from the high-voltage battery and to output electric power of which voltage is converted, and the first battery being supplied with the electric power output from the first DCDC converter,
    the first electric power source arrangement is configured to supply the electric power output from the first DCDC converter and the electric power of the first battery to the first load,
    the second electric power source arrangement is connected to a second load including at least a steering electronic control unit, a brake electronic control unit, and an information communication unit configured to exchange control information with the automatic driving system,
    the second electric power source arrangement includes a second DCDC converter and a second battery, the second DCDC converter being configured to perform voltage conversion of the electric power supplied from the high-voltage battery and to output electric power of which voltage is converted, and the second battery being supplied with the electric power output from the second DCDC converter,
    the second electric power source arrangement is configured to supply the electric power output from the second DCDC converter and the electric power of the second battery to the second load,
    the third electric power source arrangement is connected to a third load including at least the steering electronic control unit, the brake electronic control unit, and the information communication unit,
    the third electric power source arrangement includes a connection controller and a third battery, the connection controller being configured to control a connection state between the second DCDC converter and the third load, and the third battery being supplied with the electric power output from the second DCDC converter through the connection controller, and
    the third electric power source arrangement is configured to supply the electric power output from the second DCDC converter to the third load through the connection controller and to supply the electric power of the third battery to the third load.

2. The electric power source system according to claim 1, further comprising a control unit configured to control the first DCDC converter, the second DCDC converter, and the connection controller based on a state of the first battery, a state of the second battery, and a state of the third battery, wherein
    the control unit is configured to:
        perform electric power supply that gives priority to the first DCDC converter over the second DCDC converter in a case where the state of the first battery does not satisfy a first prescribed condition and the state of the second battery and the state of the third battery satisfy a second prescribed condition; and
        perform electric power supply that gives priority to the second DCDC converter over the first DCDC converter in other cases.

3. The electric power source system according to claim 2, wherein:
    the state of the first battery, the state of the second battery, and the state of the third battery each includes at least one of a state of charge, a state of function, an open circuit voltage, and an output voltage under a predefined condition; and
    the first prescribed condition is satisfied when a value of the state of the first battery is within a first prescribed range; and
    the second prescribed condition is satisfied when a value of the state of the second battery is within a second prescribed range and a value of the state of the third battery is within a third prescribed range.

4. The electric power source system according to claim 1, wherein the information communication unit acquires and stores path data that is an operation plan with regard to automatic driving of the vehicle, the path data being generated in the automatic driving system.

5. The electric power source system according to claim 1, wherein the first load further includes a cooler operated by the electric power output from the first DCDC converter and electric power of the first battery to cool the automatic driving system.

6. The electric power source system according to claim 1, wherein the connection controller is a third DCDC converter configured to perform voltage-conversion of input electric power and to output electric power of which voltage is converted, or a semiconductor relay configured to switch between an electrically connected state and a disconnected state.

* * * * *